United States Patent Office 3,218,229
Patented Nov. 16, 1965

3,218,229
CONTROLLING NEMATODES IN SOIL WITH NEMATOCIDAL BENZO[b]THIOPHENES
Fred Morris Gordon, Princeton, N.J., assignor to American Cyanamid Company, Stamford, Conn., a corporation of Maine
No Drawing. Filed May 7, 1964, Ser. No. 365,782
11 Claims. (Cl. 167—33)

The present invention relates to control of nematodes and other parasitic worm life. More particularly, the invention is directed to the utilization of certain benzo[b]thiophenes as the active component in controlling nematodes and other parasitic worm life in any stage of their life cycle.

The nematocidal benzo[b]thiophenes contemplated herein can be represented by the formula:

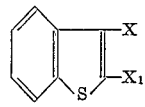

wherein X and $X_1$ each represents a radical selected from the group consisting of hydrogen and halogen and can be the same or different. The class of compounds have been prepared and are well known. In general, to prepare the halo substituted benzo[b]thiophenes, a benzo[b]thiophene can be reacted with a metalloörganic agent, such as butyllithium, to prepare a lithiobenzo[b]thiophene which can be halogenated utilizing a benzenesulfonyl chloride.

Utilizing the aforementioned class of benzo[b]thiophenes, nematode infested soils can be readily treated with the aforementioned compound to eliminate or control nematodes present in such soil.

As is known in the art, halogenated compounds have been employed as nematocides as for instance, 1,3-dichloropropene and 1,2-dichloropropane mixtures as well as ethylene dibromide. However, they are quite phytotoxic to plants at effective nematocidal rates. Accordingly, such nematocides must be applied from 10 to 14 days prior to planting in order that the plants would be unaffected. Additionally, the well-known nematocide, 1,2-dibromo-3-chloropropane, cannot be safely applied to, for instance, tobacco plants without causing phytotoxic injury, although it may be used to control nematodes in the presence of certain other crops. Where nematocides, such as tetrachlorothiophene, have been employed in tobacco growing areas, severe stunting of the tobacco plants occurred when planting took place sooner than two weeks after application of the nematocide. If a nematocide could be provided which is not phytotoxic to plants at planting time, such a nematocide would be highly desirable in advancing the art for treating nematode infested soils.

It is, therefore, a principal object of the invention to provide a class of nematocides which does not adversely affect plants either pre-emergence or post-emergence. It is a further object of the invention to provide a class of certain benzo[b]thiophenes as substantially effective nematocides, which on application, are not phytotoxic to plants. Other objects and advantages will become apparent from a consideration of the ensuing disclosure.

The benzo[b]thiophene compounds, as defined above, may be applied undiluted to the soil or they may be formulated as granules for application with a conventional fertilizer spreader, as emulsifiable concentrates or wettable powders for application as dilute sprays, as dusts for application with a conventional duster or adsorbed on activated carbon for application to seeds.

It is an advantage of the present invention that the nematocidal compounds are effective when employed in dilute concentrations. It is preferred, therefore, to incorporate the compounds in a variety of suitable solid or liquid diluents. Such compositions can be prepared either as suspensions in dilute non-solvents or as dusts. A suspension or dispersion of the nematocide in a non-solvent such as water may be prepared for direct application to the infested soil. Alternatively, a prepared suspension of the compound may be modified by the addition thereto of small amounts, usually from about 1 to 10% by weight of a commercially available surface active agent or dispersant, based on the total weight of resultant formulation. Illustrative examples of surface active agents are: sodium salt of polymeric propylnaphthyl sulfonic acid and alkylaryl polyester alcohol, a modified phthalic glycerol alkyd resin, mixtures of polyoxyethylene ethers and oil-soluble sulfonates and polyethyleneglycol fatty esters.

In the preparation of dusts, the nematocide may be admixed with a finely divided granular carrier in any convenient manner. Exemplary carriers are: bentonite, talc, pumice, silica, chalk, fuller's earth, wood flour, charcoal or activated carbon.

As stated above, application to the soil can be made by diluting an emulsifiable concentrate containing a benzo[b]thiophene with water and the resultant benzo[b]thiophene sprayed with any convenient mechanical sprayer into the planting furrow at planting time or prior to planting if desired. The benzo[b]thiophene emulsifiable concentrate can also be diluted with water and applied around the roots of the transplanted plant. Further, the benzo[b]thiophene emulsifiable concentrate can be applied as a drench to turf grass or in irrigation water, and with a suitable carrier can be injected into soil about the roots of established plants without phytotoxicity.

The following examples illustrate the nematocidal efficacy of representative benzo[b]thiophenes and further demonstrate the absence of phytotoxicity when utilized in the methods of application. Unless otherwise specified, the parts are by weight.

EXAMPLE 1

In this example a representative synthesis for the preparation of 2-chlorobenzo[b]thiophene is presented.

The apparatus is dried in an oven overnight. 131.4 parts of a heptane solution of butyllithium (15.03% by weight) in a flask under nitrogen was cooled to $-10°$ C. to $-20°$ C. A solution of 33.6 parts of benzo[b]thiophene in 50 parts (by volume) of anhydrous ether are added from a dropping funnel over 17 minutes with stirring. Cooling and stirring are continued for about 2½ hours. An additional 100 parts (by volume) of anhydrous ether are added during this period. The pale yellow mixture is siphoned into a dropping funnel of suitable volume. A solution of benzenesulfonyl chloride (44.2 parts) in 1000 parts of anhydrous ether is placed in a flask and cooled to about $-80°$ C. The lithiobenzo[b]thiophene is added from the dropping funnel over 1½ hours with stirring. The reaction mixture was stirred in the cold bath for an additional 2 hours and then was left standing overnight. The mixture is washed with 100 parts (by volume) of 5% sodium hydroxide solution, dried over calcium chloride, filtered, and evaporated. Solid 2-chlorobenzo[b]thiophene is filtered, leaving 35.2 parts of liquid which was distilled, to yield 12.5 parts of product having a boiling point equal to 51°–54° C./ 0.1–0.2 mm., and a melting point equal to 38° C. (recrystallized).

Calcd. for $C_8H_5SCl$: C, 56.97%; H, 2.99%; S, 19.01%; Cl, 21.03%. Found: C. 56.94%; H, 2.99%; S, 18.98%; Cl, 20.86%.

EXAMPLE 2

In vitro evaluation of inherent nematocidal activity of representative benzo[b]thiophenes is presented in this example.

Two free-living nematodes, *Turbatrix aceti* and *Panagrellus redivivus*, are used for evalution of inherent nematocidal activity, since their characteristic free-living habit directly exposes the organisms to the potential action of the chemical agent. To a vial with 4 ml. of water containing 0.1% of the candidate chemical are added 100 eelworms, the vial stoppered and rotated for 40 hours. At the end of the exposure time the eelworms are examined and percent mortality recorded. The following table records the inherent nematocidal activity of several benzo[b]thiophenes.

*Table I*

| Compound | Percent Mortality at 0.1% Conc. | |
|---|---|---|
| | T. aceti | P. redivivus |
| Benzo[b]thiophene | 100 | 100 |
| 2-chlorobenzo[b]thiophene | 100 | 90 |
| 3-chlorobenzo[b]thiophene | 100 | 100 |
| 2,3-dichlorobenzo[b]thiophene | | 99 |
| 2-bromobenzo[b]thiophene | 100 | |
| 3-bromobenzo[b]thiophene | 100 | |
| 2-bromo-3-chlorobenzo[b]thiophene | 100 | 100 |
| 2-fluorobenzo[b]thiophene | 100 | |

EXAMPLE 3

To demonstrate the nematocidal activity of several representative benzo[b]thiophenes against the root-knot nematode, test compounds are mixed throughout a soil mass containing root-knot nematode (Meloidogyne sp.) eggs and larvae. One quart of soil is placed in a one-gallon stainless steel beaker. A predetermined amount of the appropriate formulated benzo[b]thiophene is pipetted onto the soil which is then thoroughly mixed on a mechanical mixer. The treated soil is then distributed between two pint containers. As the containers are being filled the root-knot nematode inoculum is introduced into the soil. One week after treatment the soil is planted to a root-knot nematode susceptible tomato plant. After a month's growing time the tomato plants are removed from the soil. The roots are washed and indexed for root-knot nematode control. An index of 0 indicates complete control, an index of 1⁻ indicates almost complete control, an index of 1 indicates a high degree of control, while an index of 2 indicates no control. The following table records the results of this type of evaluation.

*Table II*

| Compound | Root-knot Nematode Index, Mgm. Compound/Quart of Soil | | |
|---|---|---|---|
| | 50 | 25 | 10 |
| Benzo[b]thiophene | 1 | | |
| 3-chlorobenzo[b]thiophene | 0 | 2 | |
| 2,3-dichlorobenzo[b]thiophene | 0 | 0 | 1 |
| 2-bromobenzo[b]thiophene | 0 | 2 | |
| 3-bromobenzo[b]thiophene | 0 | 1 | |
| 2,3-dibromobenzo[b]thiophene | 0 | 0 | 0 |

In the above example the rates of 50, 25 and 10 mgm. compound per quart of soil are equivalent to about 50, 25 and 10 pounds of compound per acre, respectively.

EXAMPLE 4

To demonstrate that 3-chlorobenzo[b]thiophene and 2,3-dichlorobenzo[b]thiophene can effectively redistribute in the soil to control root-knot nematodes, six-inch clay pots were filled with root-knot nematode (Meloidogyne sp.) infested soil and treated as follows: The compounds are diluted with xylene and an aliquot containing 16 or 32 mgm. of compound is placed in a well extending to the center of the soil mass. The well was then filled with soil, a light water seal applied and the pots removed to an 80° F. minimum temperature greenhouse. Tomato indicator plants are planted one week after treatment. One month after planting, the tomatoes are removed from the soil, the roots washed and indexed in duplicate according to the degree of galling in the table below.

*Table III*

| Compound | Mg./6-inch pot | Root-knot Index [1] | |
|---|---|---|---|
| | | I | II |
| Control | | 2 | 2 |
| 2,3-dichlorobenzo[b]thiophene | 16 | 1 | 2 |
| 2,3-dichlorobenzo[b]thiophene | 32 | 1⁻ | 1⁻ |
| 3-chlorobenzo[b]thiophene | 16 | 1 | 1 |
| 3-chlorobenzo[b]thiophene | 32 | 1 | 0 |

[1] Root-knot Index is defined in Example 3.

It is apparent from the above data that 2,3-dichlorobenzo[b]thiophene and 3-chlorobenzo[b]thiophene gave good to excellent root-knot nematode control throughout the soil mass when applied as a fumigant.

In this example 16 and 32 mg. of compound per 6-inch pot are equivalent to approximately 8 and 16 pounds of compound per acre.

EXAMPLE 5

To demonstrate enhanced nematocidal activity and the lack of phytotoxicity, 2,3-dichlorobenzo[b]thiophene prepared as an emulsifiable liquid is poured around the roots and base of young tomato and tobacco plants as they are transplanted into root-knot nematode (Meloidogyne sp.) infested soil in 6-inch pots in the greenhouse. Each plant received 100 parts of water containing 16 or 32 mg. of 2,3-dichlorobenzo[b]thiophene. After 30 days growth, the treated plants are compared with plants growing in non-infested untreated soil for phytotoxic symptoms and with plants growing in root-knot nematode infested soil but receiving no nematocidal treatment. It is evident from the following table that there is no phytotoxic effect and excellent root-knot nematode control resulted.

*Table IV*

| Plant | 2,3-dichlorobenzo[b]thiophene Mgm./Plant | Root-knot Index [1] | Growth Response |
|---|---|---|---|
| Tobacco | Control, root-knot | 2 | Size reduced. |
| Do | Control, no root-knot | 0 | Excellent growth. |
| Do | 16 | 1 | Do. |
| Do | 32 | 1 | Do. |
| Tomato | 16 | 1 | Do. |
| Do | 32 | 1 | Do. |
| Do | Control, root-knot | 2 | Size reduced. |
| Do | Control, no root-knot | 0 | Excellent growth. |

[1] Root-knot Index is defined in Example 3.

EXAMPLE 6

To further demonstrate nematocidal activity and absence of phytotoxicity of 2,3-dichlorobenzo[b]thiophene, two formulations are prepared and applied in the planting furrow with the cotton seed as it is planted in 6-inch pots in the greenhouse. The 2,3-dichlorobenzo[b]thiophene is formulated as an emulsifiable concentrate and as a 10% granule on attaclay. The emulsifiable concentrate is diluted with water and an aliquot applied to the furrow (in soil infested with Meloidogyne sp.) in such a manner as to deliver 32 or 64 mgm. of 2,3-dichlorobenzo[b]thiophene per linear foot of row. The 10% granular formulation is applied in the same manner so that 32 and 64 mgm. of 2,3-dichlorobenzo[b]thiophene is deposited per linear foot of row. The cotton is allowed to grow for two months. During this time observations are made on germination and growth. At the end of two months the plants are removed from the soil, the roots washed and indexed for root-knot nematode invasion. It is apparent from the following table that both formulations of 2,3-dichlorobenzo[b]thiophene are effective in controlling the root-knot nematode without harmful effect to the cotton seed germination or subsequent growth.

Table V

| 2,3-dichlorobenzo[b]-thiophene Formulation | Mgm./Ft. | Root-knot Index [1] | | Germination and Growth Response |
|---|---|---|---|---|
| | | I | II | |
| Emulsifiable | 32 | 1 | 1 | Germination and growth normal. |
| Do | 64 | 1- | 1- | Do. |
| 10% Granular | 32 | 1 | 1 | Do. |
| 10% Granular | 64 | 1- | 1- | Do. |
| Control | | 2 | 2 | Germination normal, growth reduced. |

[1] Root-knot Index is defined in Example 3.

Advantageously, the nematocidal compound may be effectively applied to soils, for instance, as a dust by application with a conventional duster, as an emulsion for application with sprayers, as granules for application with a conventional fertilizer spreader or adsorbed on activated carbon for application to seeds.

The benzo[b]thiophene compound defined above can vary from about 1 to 30 lbs. per acre and preferably from about 8 to about 24 lbs. per acre for effective control of nematodes and other parasitic worm life. Within the preferred concentration range, it has been found that no phytotoxicity of plants is observed.

I claim:
1. A method of controlling nematodes in soil comprising applying to a nematode infested soil a nematocidal amount of a compound of the formula:

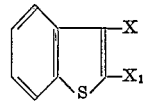

wherein X and $X_1$ represent radicals selected from the group consisting of hydrogen and halogen.

2. A method according to claim 1 wherein the compound is 2-chlorobenzo[b]thiophene.
3. A method according to claim 1 wherein the compound is benzo[b]thiophene.
4. A method according to claim 1 wherein the compound is 3-chlorobenzo[b]thiophene.
5. A method according to claim 1 wherein the compound is 2,3-dichlorobenzo[b]thiophene.
6. A method according to claim 1 wherein the compound is 2-bromobenzo[b]thiophene.
7. A method according to claim 1 wherein the compound is 3-bromobenzo[b]thiophene.
8. A method according to claim 1 wherein the compound is 2,3-dibromobenzo[b]thiophene.
9. A method according to claim 1 wherein the compound is 2-bromo-3-chlorobenzo[b]thiophene.
10. A method according to claim 1 wherein the compound is 2-fluorobenzo[b]thiophene.
11. A method of controlilng nematodes in soil comprising applying to a nematode infested soil a compound of the formula:

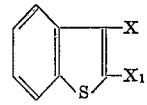

wherein X and $X_1$ represent radicals selected from the group consisting of hydrogen and halogen, at the rate of at from about 8 pounds to 24 pounds per acre.

References Cited by the Examiner
UNITED STATES PATENTS

| 2,928,766 | 3/1960 | Rosen | 167—33 |
| 2,937,972 | 5/1960 | Bluestone et al. | 167—33 |
| 3,073,691 | 1/1963 | Bluestone | 71—2.5 |
| 3,073,692 | 1/1963 | Berkey | 71—2.5 |
| 3,099,658 | 7/1963 | Bluestone | 260—332.1 |
| 3,130,199 | 4/1964 | Bimber et al. | 260—330.5 |
| 3,136,782 | 6/1964 | Bimber et al. | 260—330.5 |

LEWIS GOTTS, *Primary Examiner.*